(12) United States Patent
Shi

(10) Patent No.: US 8,555,365 B2
(45) Date of Patent: Oct. 8, 2013

(54) DIRECTORY AUTHENTICATION METHOD FOR POLICY DRIVEN WEB FILTERING

(75) Inventor: Fleming Shi, Cupertino, CA (US)

(73) Assignee: Barracuda Networks, Inc., Campbell, CA (US)

( * ) Notice: Subject to any disclaimer, the term of this patent is extended or adjusted under 35 U.S.C. 154(b) by 275 days.

(21) Appl. No.: 12/784,497

(22) Filed: May 21, 2010

(65) Prior Publication Data
US 2011/0289575 A1 Nov. 24, 2011

(51) Int. Cl.
*H04L 29/06* (2006.01)

(52) U.S. Cl.
USPC ............... 726/8; 726/4; 726/5; 726/6; 726/9; 726/10; 713/152; 713/153; 713/154; 713/156

(58) Field of Classification Search
USPC .................................. 726/5, 8; 709/203, 246
See application file for complete search history.

(56) References Cited

U.S. PATENT DOCUMENTS

| 2010/0064353 A1* | 3/2010 | Kan et al. ........................... 726/5 |
| 2011/0055912 A1* | 3/2011 | Fusari et al. ...................... 726/8 |

\* cited by examiner

*Primary Examiner* — Longbit Chai
(74) *Attorney, Agent, or Firm* — Patentry

(57) ABSTRACT

Enabling web filtering by authenticated group membership, role, or user identity is provided by embedding a uniform resource identifier into an electronic document requested by a client. A client browser will provide directory credentials to a trusted web filter apparatus enabling a policy controlled access to resources external to the trusted network. An apparatus comprises circuits for transmitting a uniform resource identifier to a client, receiving a request comprising authentication credentials, querying a policy database and determining a customized policy for access to an externally sourced electronic document or application. A computer-implemented technique to simplify web filter administrator tasks by removing a need to set each browsers settings or install additional software on each user terminal.

1 Claim, 5 Drawing Sheets

DIRECTORY AUTHENTICATION METHOD FOR POLICY DRIVEN WEB FILTERING

BACKGROUND

Web Clients and Servers

As is known in the art, the primary function of a web server is to deliver web pages to clients. This means delivery of HTML documents and any additional content that may be included by a document, such as images, style sheets and JavaScripts.

A client, commonly a web browser, initiates communication by making a request for a specific resource using HTTP and the server responds with the content of that resource, or an error message if unable to do so. The resource is typically a real file on the server's secondary memory, but this is not necessarily the case and depends on how the web server is implemented.

While the primary function is to serve content, a full implementation of HTTP also includes a way of receiving content from clients. This feature is used for submitting web forms, including uploading of files.

Conventional Web Filters

A conventional web filter blocks access to Web servers and Internet applications and attempts to eliminate spyware and other forms of malware from an organization. Typical web filters

- Block access to Web sites based on domain, URL pattern, or content category
- Block downloads based on file type
- Block applications that access the Internet, including IM, music services, and software update utilities
- Integrate with "safe search" filters built into popular images search engines
- Provide gateway and desktop spyware protection Directory Access Services Directory Access Services are known to those skilled in the art as a set of database and related technologies which allows administrators to assign policies, deploy software, and apply critical updates to an organization. Typically, Active Directory stores information and settings in a central database. Such networks are popular from a small installation with a few computers, users and printers to tens of thousands of users, many different domains and spanning many geographical locations. This and similar resources provide information security and single sign-on for user access to network based resources. However resources external to a network, such as servers on the Internet are not easily controlled and the recipients of data originating from outside the network are not conveniently authenticated without substantial network administration work.

What is needed is an easily installed way to determine the authenticated group, role, and identity of a user requesting a resource or application from an external server, a way to control access by said user, and a way to disable access to external resources according to a policy customized to groups, roles, and individuals. What is needed is a way to easily enforce custom policies for particular users and groups across customizable time ranges by integrating with LDAP directory servers, such as Microsoft Active Directory, for both authentication and group membership information on which to apply custom policies.

SUMMARY OF THE INVENTION

A policy based web filter provides access to web documents according to user identity. The apparatus operates on custom policies for particular users and groups across customizable time ranges. The method integrates with LDAP directory servers, such as Microsoft Active Directory, or Kerberos, or NTLM single sign-on techniques for both authentication and group membership information on which to apply custom policies.

A method provides policy based access to web servers controlled by user identity by receiving a document from a server requested by a client coupled to an active directory server, transmitting a uniform resource identifier to the client, in a preferred embodiment, a transparent pixel, which references a policy server within a trusted network controlled by the active directory server, receiving a user authentication certificate, key, or ticket, determining in a policy database that the user may access the document, and fulfilling the request.

The policy based web filter is installed within the trusted network as a object identified to the active directory which provides single sign-on services to all servers, clients, and users. It receives credentials which authenticate group, role, and user identity in response to an uri which it has transmitted to a destination when it receives an externally sourced web page.

DETAILED DISCLOSURE OF EMBODIMENTS

Figure 2:
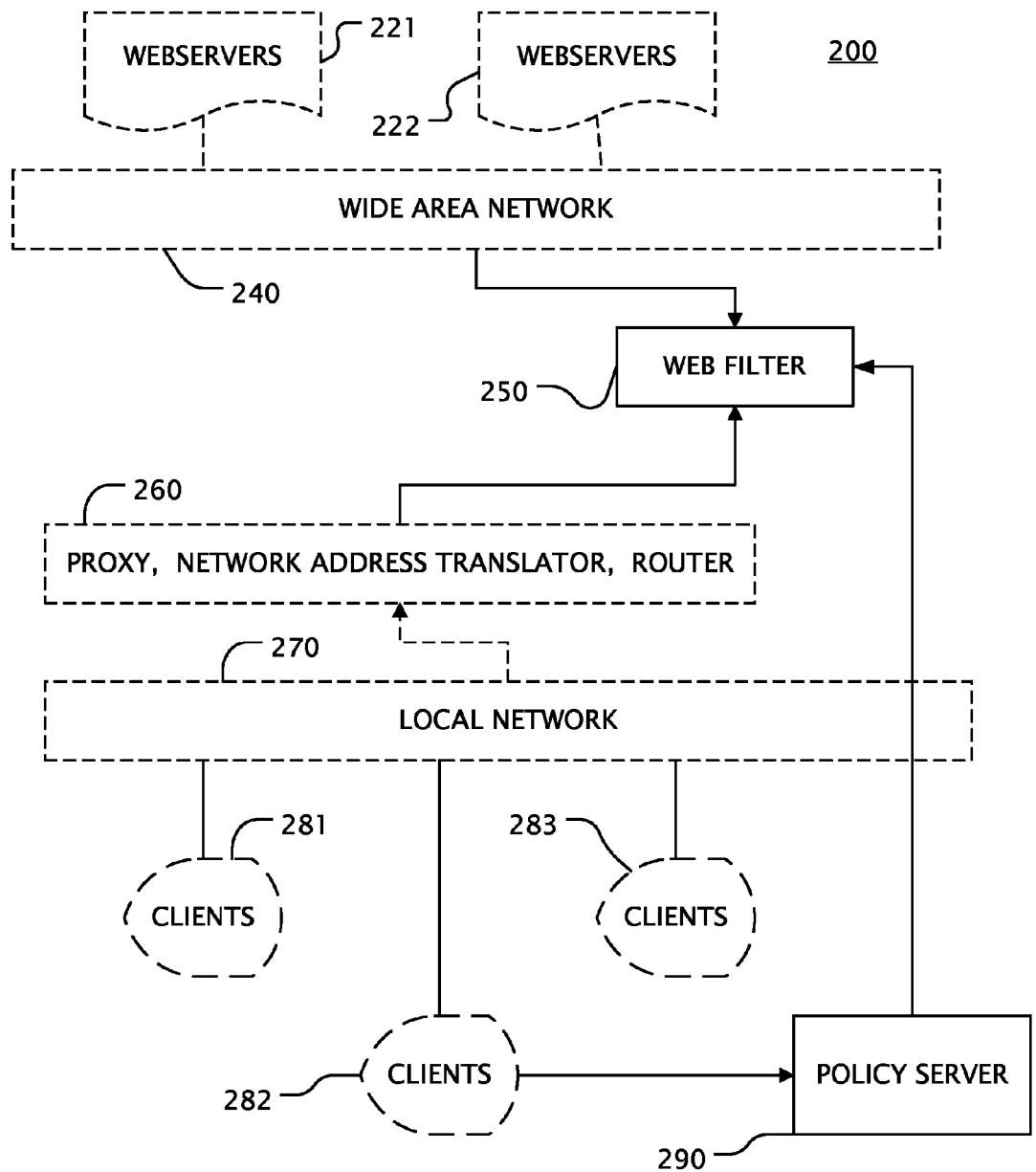
FIGS. 2-4 are block diagrams of a system.

Referring now to FIG. 2, within a local area network 270 a plurality of clients 281-283 are communicatively coupled to a policy server 290. However external web servers 221 222 are not trusted resources. In order to provide policy based access to external web servers coupled to a wide area network 240 through a proxy, firewall or router 60, all incoming web traffic is channeled through a web filter 250. The web filter transmits a document comprising a uniform resource identifier to the client of the web page. The uniform resource identifier references a resource on a policy server 290 within the trusted network. As a result of requesting the resource, the client and the policy server will exchange credentials. Based on the policy established for the user a session with the web server can be controlled. Based on the policy established for the user portions of the document provided by the web server can be presented or suppressed.

Figure 3:
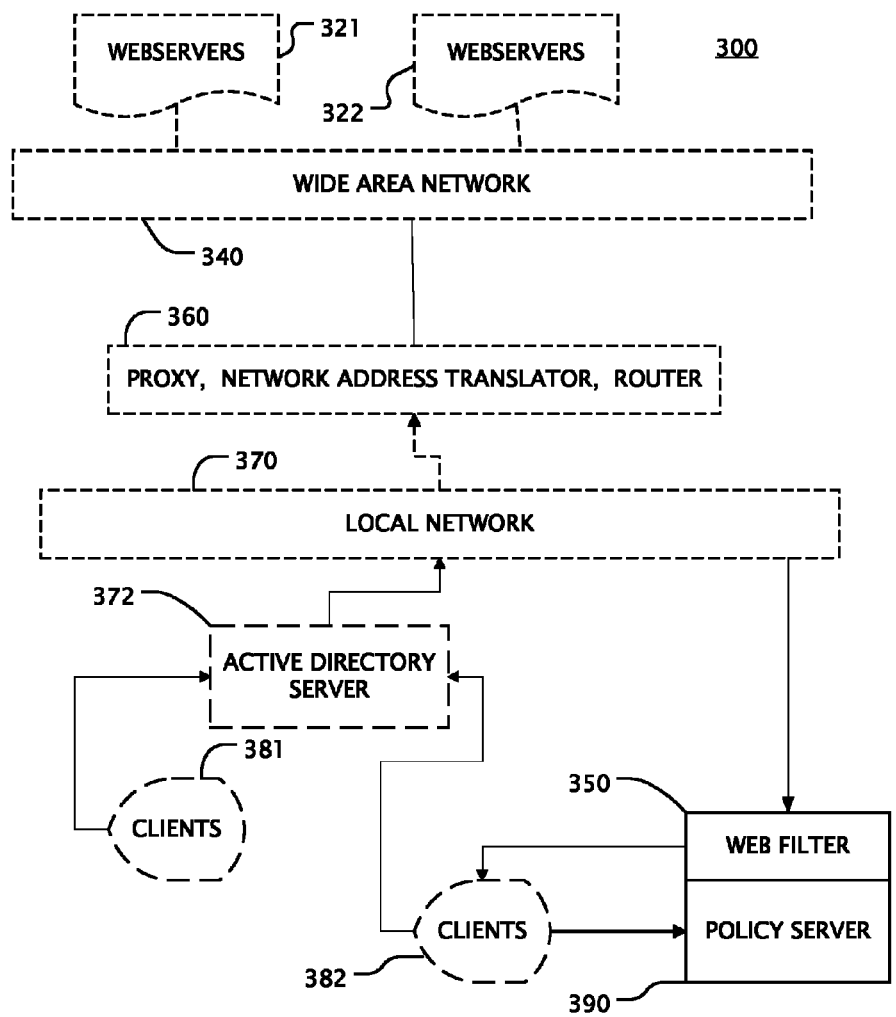

Referring now to FIG. 3, within a local area network 370 a plurality of clients 381 382 are communicatively coupled to an active directory server 372 which provides a single sign-on service to all network resources. However external web servers 321 322 are not members of the active directory and therefore not trusted resources. In order to provide policy based access to external web servers coupled to a wide area network 340 through a proxy, firewall or router 360, all incoming web traffic is channeled through a web filter 350. The web filter transmits a document comprising a uniform resource identifier to the client of the web page. The uniform resource identifier references a resource on a policy server 390 within the trusted network. As a result of requesting the resource, the client and the policy server will exchange single sign-on credentials. Based on the policy established for the user a session with the web server can be controlled. Based on the policy established for the user portions of the document provided by the web server can be presented or suppressed. In an embodiment, the web filter may present the client with a frameset document which comprises the Uniform Resource Identifier (URI) to the policy server and upon checking the user credential against the policy database, fulfill the original request in a frame.

Figure 4:
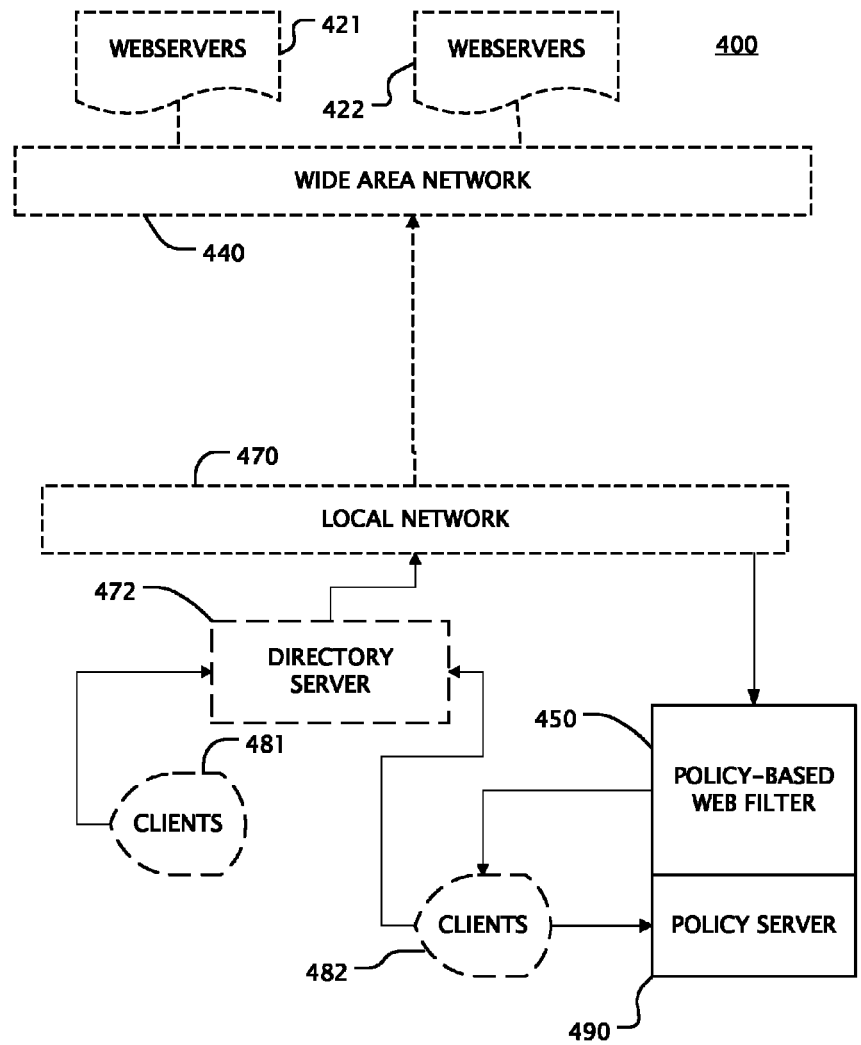

Referring now to FIG. 4, within a local area network 470 a plurality of clients 481 482 are communicatively coupled to an active directory server 472 which provides a single sign-on service to all network resources. However external web servers 421 422 are not members of the active directory and therefore not trusted resources. In order to provide policy based access to external web servers coupled on a wide area network 440, all incoming web traffic is channeled through a policy-based web filter 450. The web filter transmits a document comprising a uniform resource identifier to the client of the web page. The uniform resource identifier references a resource on a policy server within the trusted network. As a result of requesting the resource, the client and the policy server 490 will exchange single sign-on credentials. Based on the policy established for the user a session with the web server can be controlled. Based on the policy established for the user portions of the document provided by the web server can be presented or suppressed. In an embodiment, the web filter may present the client with a frameset document which comprises the Uniform Resource Identifier (URI) to the policy server and upon checking the user credential against the policy database, fulfill the original request in a frame.

In an embodiment, the invention comprises a web filter and a policy server, wherein said web filter and policy server share a local area network with at least one client workstation. The local area network is coupled to the Internet and a plurality of web servers by the web filter. A request from a client workstation passes through the web filter to an internet server. A reply passes through the web filter.

Figure 5:
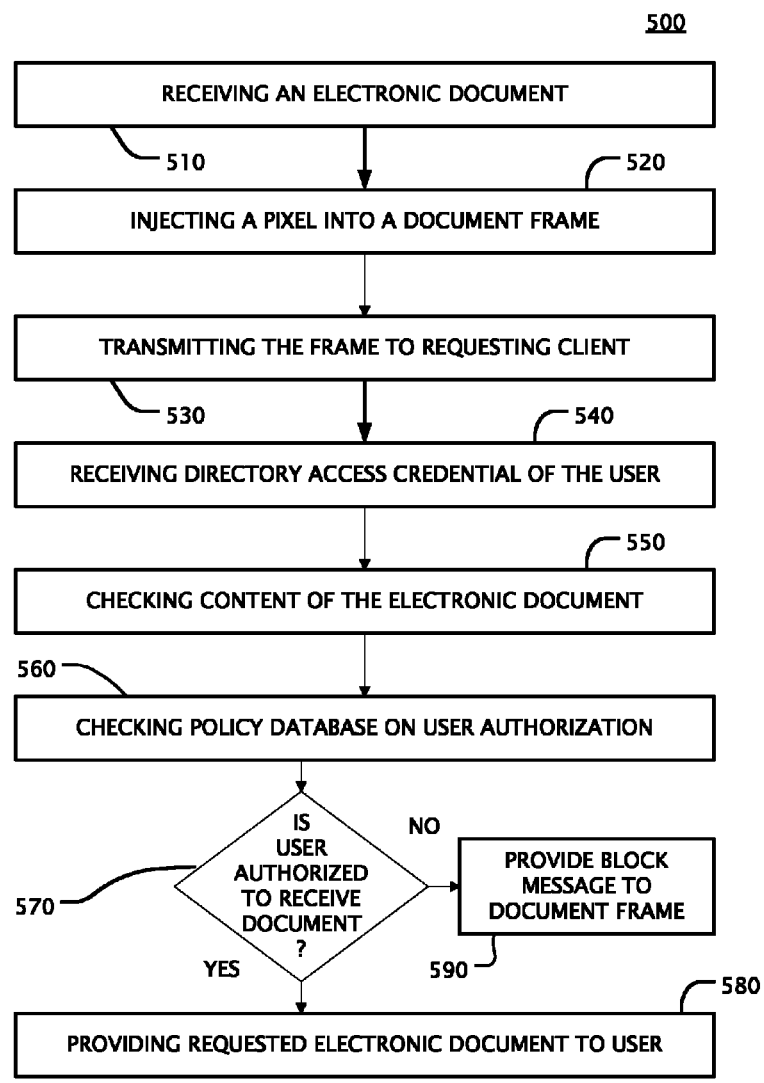
FIG. 5 is a flow chart of a computer-implemented method.

Referring now to FIG. 5 an aspect of the invention is a method for applying a web filter policy to signed-on users operating a client in a network, comprising, receiving an electronic document 510 from a target site external to the network which was requested by a client within the network, injecting a pixel into a document frame 520 for the electronic document but withholding the electronic document until it is determined the content is allowed to the user, and transmitting the frame to the requesting client 530.

In an embodiment the pixel comprises a link to a policy database server in the network known to the directory access service, and the method further comprises receiving at the policy database server a directory access credential of the user from requesting the pixel at the client 540.

In an embodiment the method further comprises the steps:

checking the content of the electronic document 550, determining according to a policy database server 570, based on the directory access credentials of the user 560 and the content of the electronic document, if the user is not authorized, providing a block message into the document frame 590, and if the user is authorized, providing the requested electronic document into the document frame 580.

The method of the invention is to first pass a request from a client workstation for a web page to an internet server and receive a document such as an html page in reply.

The second step of the method is to exchange identifying information with a policy server which associates an identifying code with a pixel, linking said pixel to the policy server, and to append the pixel into a webpage being served to the client workstation. The display of the html page by a browser on the client workstation, will also request a resource from the policy server and transmit the identifying code to the policy server from a specific client workstation which is logged into the local area net.

Further policy control over web security follows from checking the identified client workstation and identified internet server in a policy database.

While we are injecting the pixel, we will withhold data until we make a decision that the target site is allowed. If not, we will send a block page. We will build a delayed frame to handle this.

An apparatus embodying the invention comprises a policy engine to determine if the authenticated user is allowed access to the categorized content, a content filter circuit to categorize the content, a resource server to receive a request for a resource and the authentication credential provided by the user's browser, a web page receiver circuit to receive web page content from a source, and a transmission circuit to provide a uniform resource identifier (URI) to the client which requested the web page.

In an embodiment the URI points to a transparent pixel served locally within the trusted network by the apparatus which is identified in the same directory system as the user. The traffic for the pixel is trusted and single sign-on enabled.

In an embodiment the apparatus transmits a frame document which comprises the URI of the transparent pixel. The content would be delivered into a frame if the policy engine determines it is allowed.

An other aspect of the invention is a network device, comprising: a processor, wherein the processor is operable to provide a service which provides a policy based webfilter operable to at least one of:

receive from at least one of the web servers a hypertext document, augment said hypertext document by inserting a uniform resource identifier to a resource located in a policy server, and transmit said augmented hypertext document to at least one of said web clients receive from at least one web client, a request for said resource; whereby at least one web client is identified as having a client server session with at least one web server, and wherein said uniform resource identifier comprises a query string which identifies the web server source of the hypertext document or wherein said web filter communicates to said policy server an identifier of the web server source of a hypertext document which has been augmented with a uniform resource identifier and within the policy server, check for a policy on said web client being communicatively coupled to said web server.

An other aspect of the invention is a network device, comprising: a processor, wherein the processor is operable to provide a service which provides a policy based webfilter operable to at least one of:

receive a document from a server requested by a client coupled to an active directory server, transmit a uniform resource identifier to the client which references a policy server within a trusted network controlled by the active directory server, receive a user authentication, determine in a policy database that the user may access the document, and fulfill the request.

An other aspect of the invention is a network device, comprising: a processor, wherein the processor is operable to provide a service which provides a policy based webfilter operable to at least one of:
- receive from a web client an authentication credential configured to support single sign-on user operation in response to the web client receiving a first electronic document comprising a uniform resource identifier configured to elicit a request from the web filter apparatus;
- transmit to the web client the aforesaid first electronic document in response to receiving a second electronic document from the external web server requested by the web client;
- query a policy database to determine if the authentication credential permits access by the single sign-on user to the content of the second electronic document; and
- fulfill the request by the web client for said content upon the condition that the policy database does not disallow it.

An other aspect of the invention is a network device, comprising: a processor, wherein the processor is operable to provide a service which provides a policy based webfilter operable to at least one of:
- receive an electronic document from a target site external to the network which was requested by a client within the network,
- inject a pixel into a document frame for the electronic document but withholding the electronic document until it is determined the content is allowed to the user, and
- transmit the frame to the requesting client wherein the pixel comprises a link to a policy database server in the network known to the directory access service, and
- further comprising receive at the policy database server a directory access credential of the user from requesting the pixel at the client,
- check the content of the electronic document,
- determine according to a policy database server, based on the directory access credentials of the user and the content of the electronic document,
- if the user is not authorized, provide a block message into the document frame, and
- if the user is authorized, provide the requested electronic document into the document frame.

An other aspect of the invention is a computer-readable medium for operating a service which provides a policy based webfilter, comprising at least one sequence of instructions, wherein execution of the instructions by a processor configures the processor to perform at least one of the steps of:
- receiving from at least one of the web servers a hypertext document,
- augmenting said hypertext document by inserting a uniform resource identifier to a resource located in a policy server, and
- transmitting said augmented hypertext document to at least one of said web clients
- receiving from at least one web client, a request for said resource; whereby at least one web client is identified as having a client server session with at least one web server, and wherein said uniform resource identifier comprises a query string which identifies the web server source of the hypertext document or
wherein said web filter communicates to said policy server an identifier of the web server source of a hypertext document which has been augmented with a uniform resource identifier and
within the policy server,
checking for a policy on said web client being communicatively coupled to said web server.

An other aspect of the invention is a computer-readable medium for operating a service which provides a policy based webfilter, comprising at least one sequence of instructions, wherein execution of the instructions by a processor configures the processor to perform at least one of the steps of
- receiving a document from a server requested by a client coupled to an active directory server,
- transmitting a uniform resource identifier to the client which references a policy server within a trusted network controlled by the active directory server,
- receiving a user authentication,
- determining in a policy database that the user may access the document, and
- fulfilling the request.

An other aspect of the invention is a computer-readable medium for operating a service which provides a policy based webfilter, comprising at least one sequence of instructions, wherein execution of the instructions by a processor configures the processor to perform at least one of the steps of
- receiving from a web client an authentication credential configured to support single sign-on user operation in response to the web client receiving a first electronic document comprising a uniform resource identifier configured to elicit a request from the web filter apparatus;
- transmitting to the web client the aforesaid first electronic document in response to receiving a second electronic document from the external web server requested by the web client;
- querying a policy database to determine if the authentication credential permits access by the single sign-on user to the content of the second electronic document; and
- fulfilling the request by the web client for said content upon the condition that the policy database does not disallow it.

An other aspect of the invention is a computer-readable medium for operating a service which provides a policy based webfilter, comprising at least one sequence of instructions, wherein execution of the instructions by a processor configures the processor to perform at least one of the steps of
- receiving an electronic document from a target site external to the network which was requested by a client within the network,
- injecting a pixel into a document frame for the electronic document but withholding the electronic document until it is determined the content is allowed to the user, and
- transmitting the frame to the requesting client wherein the pixel comprises a link to a policy database server in the network known to the directory access service, and
- further comprising receiving at the policy database server a directory access credential of the user from requesting the pixel at the client,
- checking the content of the electronic document,
- determining according to a policy database server, based on the directory access credentials of the user and the content of the electronic document,
- if the user is not authorized, providing a block message into the document frame, and
- if the user is authorized, providing the requested electronic document into the document frame.

CONCLUSION

The present invention may be easily distinguished from conventional web filters by comprising a searchable policy database which allows access to external public applications and server according to authenticated group, role, or identity of a user. The present invention is distinguished from conventional web filters by transmission means of a uniform resource identifier to a client which elicits provision of authentication credentials by a user to the policy driven web filter. The present invention is distinguished from conventional web filters by not only filtering on the content but also storing the content and forwarding it only to an authenticated user who is in a policy database.

Each webpage that is received by the web filter for one of the web clients is augmented with a link to resource served by a policy server which is coupled to a local network attached to the plurality of clients. This is an improvement which reduces administrators conventional practice of installing additional software on PC's, setting each browser's proxy settings, or adjusting group proxy settings to achieve the benefits of single sign-on.

Figure 1:
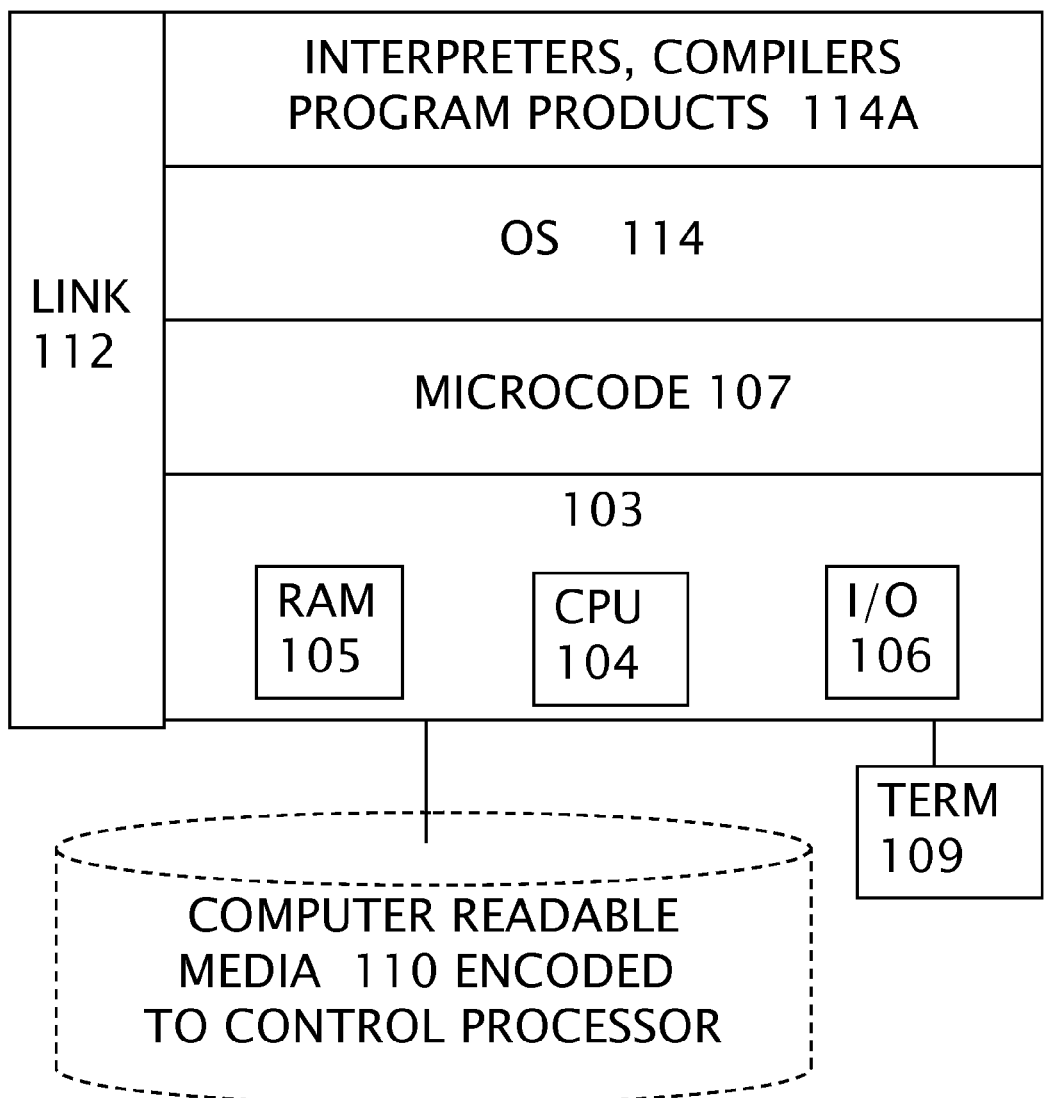
FIG. 1 illustrates a conventional processor means for an apparatus.

Although not required, aspects of the invention have been described herein in the general context of computer-executable instructions, such as program modules, being executed by computers 100 in network environments. A example of a computer in a horizontally scalable system is illustrated in FIG. 1 comprising a server 100. Said server comprises a processor 103 configured by microcode 107, an operating system 114, and in embodiments interpreters, compilers, and program products 114A. Such a system is coupled to other servers through a network link 112, and to a local or remote terminal 109. A conventional processor 103 comprises random access memory 105, a central processing unit 104 and an input output circuit 106. Generally, program modules include routines, programs, objects, components, and content structures that perform particular tasks or implement particular abstract content types. Computer-executable instructions, associated content structures, and program modules represent examples of program code for executing aspects of the methods disclosed herein.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

Many modifications and other aspects of the invention will come to mind to one skilled in the art to which this invention pertains having the benefit of the teachings presented in the foregoing descriptions and the associated drawings. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for purposes of limitation.

The present invention may be embodied in other specific forms without departing from its spirit or essential characteristics. The scope of the invention is, therefore, indicated by the appended claims rather than by the foregoing description.

What is claimed is:

1. A method for operation of a policy controlled web filter on an authenticated user of a client workstation in a trusted network comprising:

receiving at the policy controlled web filter an electronic document, from a target site external to the trusted network, which was requested by the client workstation within the trusted network;

determining an authenticated group, role, and identity of a user requesting said electronic document by exchanging directory access credentials between said client and a policy database server;

categorizing the content of the electronic document;

determining according to a policy database server, based on the directory access credentials of the authenticated user and the categorized content of the electronic document;

if the authenticated user is not authorized, providing a block message into a document frame so as to withhold the requested document; and if the authenticated user is authorized, fulfilling the request by providing the requested electronic document into the document frame;

wherein, determining an authenticated group, role, and identity of a user has three steps, firstly, injecting by the policy controlled web filter a pixel into the document frame for obtaining the requested electronic document;

secondly, transmitting said document frame to the requesting client wherein the pixel comprises a uniform resource identifier (uri) to a resource at a policy database server in the trusted network known to a directory access service, thirdly, exchanging among said client and said policy database server, directory access credentials as a result of the client requesting the resource at the policy database server, whereby policy based access to web documents are controlled according to user identity.

* * * * *